(12) United States Patent
Klein

(10) Patent No.: US 12,118,874 B2
(45) Date of Patent: Oct. 15, 2024

(54) TOTAL PROPERTY INTELLIGENCE SYSTEM

(71) Applicant: Matias Klein, Eagleville, PA (US)

(72) Inventor: Matias Klein, Eagleville, PA (US)

( * ) Notice: Subject to any disclaimer, the term of this patent is extended or adjusted under 35 U.S.C. 154(b) by 224 days.

(21) Appl. No.: 17/322,395

(22) Filed: May 17, 2021

(65) Prior Publication Data

US 2021/0406556 A1 Dec. 30, 2021

Related U.S. Application Data

(62) Division of application No. 15/879,798, filed on Jan. 25, 2018, now Pat. No. 11,010,614.

(Continued)

(51) Int. Cl.
*H04L 9/14* (2006.01)
*G06Q 10/0635* (2023.01)
(Continued)

(52) U.S. Cl.
CPC ......... *G08B 25/10* (2013.01); *G06Q 10/0635* (2013.01); *G06Q 20/14* (2013.01); *G06V 20/13* (2022.01); *G06V 20/52* (2022.01); *G07G 3/00* (2013.01); *G08B 13/196* (2013.01); *G08B 13/24* (2013.01); *G08B 29/188* (2013.01); *H04L 9/006* (2013.01); *H04L 9/14* (2013.01); *H04L 9/30* (2013.01); *H04L 9/3263* (2013.01); *G06F 16/903* (2019.01); *G06F 18/214* (2023.01);
(Continued)

(58) Field of Classification Search
CPC .. G07G 3/00; H04L 9/14; H04L 9/006; H04L 9/3263; H04L 9/30; G06Q 10/0635; G06Q 20/10; G06Q 40/08; G06Q 2220/00; G08B 29/188; G08B 25/10; G08B 13/196; G08B 13/24; G06V 20/52; G06V 20/13; G06N 5/022; G06N 20/00; G06N 5/046; G06F 18/214; G06F 18/25; G06F 16/903

USPC ......................................................... 713/156
See application file for complete search history.

(56) References Cited

U.S. PATENT DOCUMENTS

| 7,508,941 | B1 * | 3/2009 | O'Toole, Jr. | .......... | H04L 9/3263 |
| | | | | | 380/232 |
| 7,921,283 | B2 * | 4/2011 | Hayes | .................... | H04L 9/321 |
| | | | | | 713/157 |

(Continued)

*Primary Examiner* — Amare F Tabor
(74) *Attorney, Agent, or Firm* — Troutman Pepper Hamilton Sanders LLP

(57) ABSTRACT

A total property security system may be implemented to conduct security and surveillance operations. The system includes security operations centers that are connected to one or more sensors and vehicles for collecting and transmitting surveillance data to a database hosted on cloud services. The collected surveillance data is analyzed in order to automatically deploy security measures and/or recommend courses of action using a rules engine that can be configured to client-specific or user-specific security needs. The cloud services can provide a set of application program interface services that can act on the surveillance operations center. Sensor fusion data and other surveillance data can be also transmitted to vetted monitoring service providers on a subscription basis to provide physical security services to the area within the property perimeter. During the subscription period, the selected monitoring service providers can obtain time-based encryption token for accessing surveillance data.

5 Claims, 6 Drawing Sheets

Related U.S. Application Data

(60) Provisional application No. 62/450,658, filed on Jan. 26, 2017.

(51) Int. Cl.
| | | |
|---|---|---|
| *G06Q 20/14* | (2012.01) | |
| *G06V 20/13* | (2022.01) | |
| *G06V 20/52* | (2022.01) | |
| *G07G 3/00* | (2006.01) | |
| *G08B 13/196* | (2006.01) | |
| *G08B 13/24* | (2006.01) | |
| *G08B 25/10* | (2006.01) | |
| *G08B 29/18* | (2006.01) | |
| *H04L 9/00* | (2022.01) | |
| *H04L 9/30* | (2006.01) | |
| *H04L 9/32* | (2006.01) | |
| *G06F 16/903* | (2019.01) | |
| *G06F 18/214* | (2023.01) | |
| *G06F 18/25* | (2023.01) | |
| *G06N 5/022* | (2023.01) | |
| *G06N 5/046* | (2023.01) | |
| *G06N 20/00* | (2019.01) | |
| *G06Q 20/10* | (2012.01) | |
| *G06Q 40/08* | (2012.01) | |

(52) U.S. Cl.
CPC ............. *G06F 18/25* (2023.01); *G06N 5/022* (2013.01); *G06N 5/046* (2013.01); *G06N 20/00* (2019.01); *G06Q 20/10* (2013.01); *G06Q 40/08* (2013.01); *G06Q 2220/00* (2013.01)

(56) References Cited

U.S. PATENT DOCUMENTS

| | | | |
|---|---|---|---|
| 8,683,214 B2* | 3/2014 | Unagami | H04L 9/0891 |
| | | | 713/187 |
| 8,914,526 B1* | 12/2014 | Lindquist | H04L 12/4641 |
| | | | 709/229 |
| 9,407,881 B2 | 8/2016 | Renkis | |
| 10,045,156 B2* | 8/2018 | Malone | G01S 5/12 |
| 10,145,684 B1 | 12/2018 | Tofte et al. | |
| 10,277,867 B2* | 4/2019 | Jung | G06F 21/602 |
| 10,322,801 B1 | 6/2019 | Yeturu | |
| 10,370,102 B2 | 8/2019 | Boykin et al. | |
| 10,447,470 B2 | 10/2019 | Viswanathan et al. | |
| 10,625,879 B2 | 4/2020 | Di Benedetto et al. | |
| 10,992,461 B2* | 4/2021 | Racz | H04L 9/0825 |
| 2016/0062992 A1* | 3/2016 | Chen | H04L 9/3242 |
| | | | 707/736 |
| 2016/0236638 A1 | 8/2016 | Lavie et al. | |
| 2016/0327645 A1 | 11/2016 | Nishimoto et al. | |
| 2017/0031369 A1 | 2/2017 | Liu et al. | |
| 2017/0124834 A1* | 5/2017 | Pedersoli | H04L 65/613 |
| 2017/0161961 A1 | 6/2017 | Salsberg | |
| 2017/0369184 A1 | 12/2017 | Di Benedetto et al. | |
| 2018/0068165 A1 | 3/2018 | Cantrell et al. | |

\* cited by examiner

TOTAL PROPERTY INTELLIGENCE SYSTEM

CROSS-REFERENCE TO RELATED APPLICATIONS

This application is a divisional of U.S. patent application Ser. No. 15/879,798 filed Jan. 25, 2018, which claims the benefit of U.S. Provisional Patent Application No. 62/450,658 filed Jan. 26, 2017, each of which is hereby incorporated in its entirety.

FIELD OF THE INVENTION

The present invention relates generally to a system and method for providing physical security. More particularly, the present invention is directed to a system and method that integrates network-enabled sensors, cameras, and unmanned ground and/or aerial vehicles to deliver a total property intelligence system.

BACKGROUND OF THE INVENTION

Various property management and home surveillance systems exist in the art. Existing surveillance systems typically comprise built-in cameras that can be set to capture footage continuously or based on motion and motion-activated alarms for monitoring areas around a property for visitors. While existing surveillance systems provide some protection, these systems remain vulnerable to individuals that can bypass zones on an alarm system.

Accordingly, there is a need in the art for an improved surveillance system that can dynamically monitor properties to minimize bypassing and physical security breach. In this regard, the invention described herein addresses this problem by disclosing a security system that comprises a plurality of Internet-connected sensors, cameras, and unmanned vehicles that communicate with a security operations center to deliver a more comprehensive monitoring service.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

In various embodiments, the total property security system (TPSS) comprises one or more security operations center (SOC) connected to a network via a terminal, wherein the SOC is connected to one or more sensors, cameras, unmanned ground/aerial vehicles (UGVs/UAVs), and/or other devices operating within a defined property perimeter. The SOC maintains one or more maps of the area within the property perimeter that is being monitored. The map comprises GPS coordinates of the perimeter and data on key physical features (e.g., trees, rocks, drops, obstacles, etc.) of the property for establishing patrol routes and perimeter boundaries. In some embodiments, the map is computer generated by stitching aerial photography (e.g., obtained via satellite and/or drone) and augmenting with other data, including 3D point cloud and other sensor-generated data (e.g., data generated from LIDAR, thermal imaging, etc.).

The sensors, cameras, UGVs/UAVs, and/or other devices are configured to collect various data for monitoring the physical security of the area within the property perimeter. Without limitation, the sensors can comprise motion sensors, heat sensors, vibration sensors, sound sensors, and/or so forth. Additionally, the UGVs/UAVs can comprise sensors, cameras, and/or other types of module attachment systems removably attached or permanently affixed thereon. As implied above, the sensors, cameras, and UGVs/UAVs are network-enabled so that they can transmit collected sensor data and/or other information to the terminal at SOC. Collected data are analyzed in order to automatically deploy security measures and/or recommend courses of action using a rules engine that can be configured to client-specific or user-specific security needs. Additionally, machine-learning techniques can be applied to automate rule generation and optimization. For example, the collected data can be used to route one or more unmanned ground/aerial vehicles to a specific location within the property perimeter for conducting inspections, providing alerts, and/or so forth.

In various embodiments, the collected data can be transmitted to one or more cloud-based database services such as the TPSS cloud for storage. The TPSS cloud and/or other cloud services can also provide a set of application program interface (API) services that can act on the SOC's sensor fusion data generated via sensor fusion using sensor data stream received from the various sensor devices. Without limitation, API services can include a navigation API, video/audio API, alerts/communication API, web and/or mobile application services, asset management API, analytics API, hosting API, data encryption API, and/or so forth.

In various embodiments, the system further comprises one or more monitoring service provider (MSP) that can subscribe to a sensor and/or video data to provide, without limitation, physical security services, backup services, and/or so forth, to the area within the property perimeter for a defined period of time, or the subscription period. The MSP can be selected by an end user and credentialed (e.g., by a credentialing entity, the SOC, and/or so forth) during an onboarding process to allow for connection with the cloud services, which can securely transmit video streams and sensor data associated with the area to authorized MSP. During the subscription period, the MSP can receive live video and sensor stream correlating to the property that it is monitoring from the cloud services, wherein the cloud services can be configured to consolidate sensor data and video feed received from respective SOCs. In various embodiments, each stream is available for a set time limit via a public key infrastructure (PKI), which may be implemented using blockchain technology. In this regard, the data that is streamed is encrypted and can only be decrypted via a private key available to the MSP, wherein the key can expire when the subscription period is terminated.

In some embodiments, the MSP and the end user can access an application (i.e., via a user device such as a computer) that is configured to provide a front-end user interface (UI), which allows for viewing video clips or stream video, receive alerts and notifications, search for and purchase monitoring or security services from MSPs, conduct MSP onboarding and credentialing, manage MSP subscription, set preferences and settings, and customize user-specific security needs.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar to identical items.

DETAILED DESCRIPTION OF THE INVENTION

Example Architecture

Figure 1:
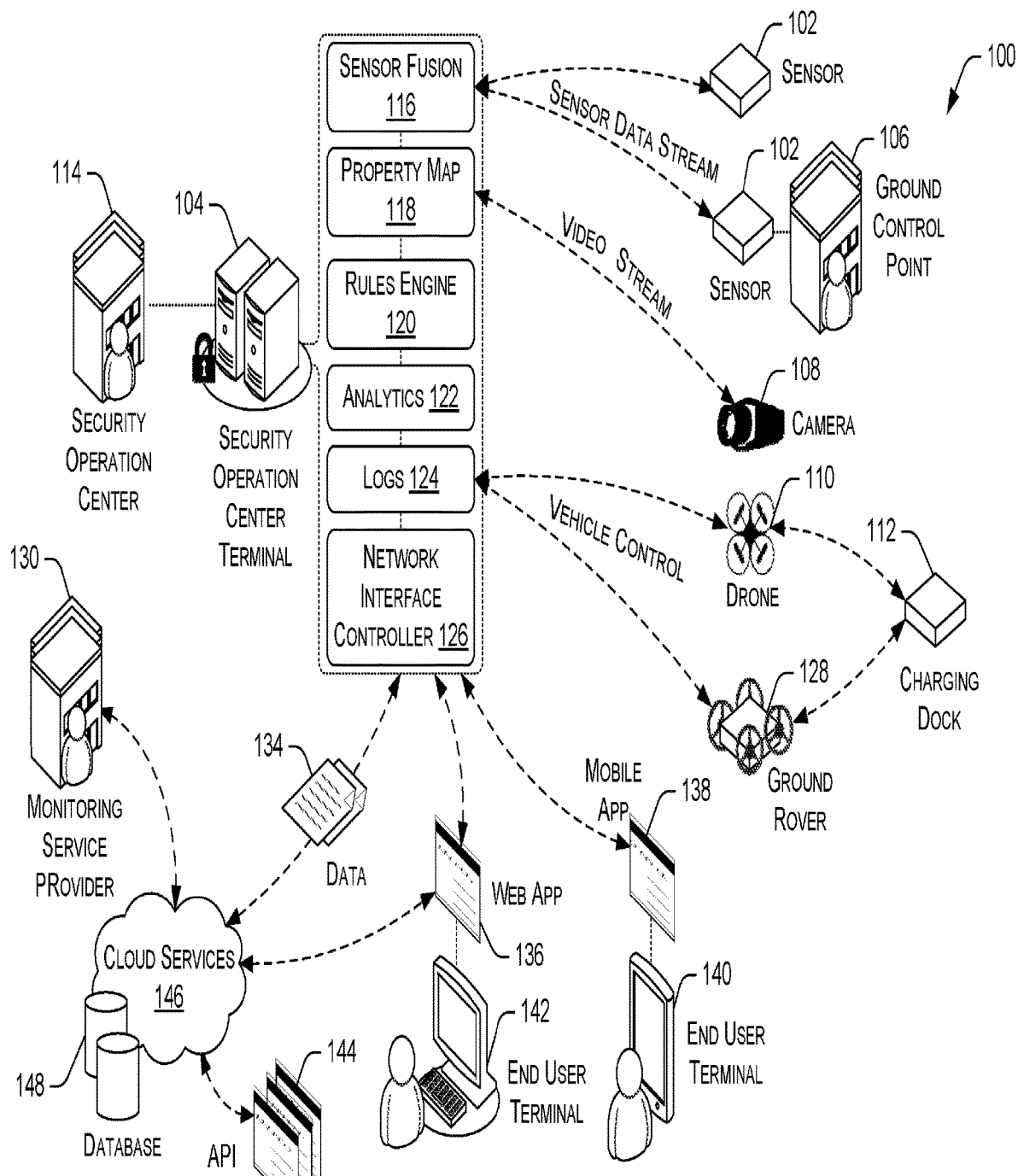
FIG. 1 shows example architecture for integrating network-enabled sensors, cameras, and unmanned ground and/or aerial vehicles for providing a complete property security.

Referring now to FIG. 1, there is shown an exemplary overview of the present system 100 for integrating network-enabled sensors, cameras, and unmanned ground and/or aerial vehicles for providing a complete property security. The system comprises at least one security operation center 114 having a security operation center terminal 104 for conducting security operations for an area within a defined property perimeter, wherein the area can comprise a building, a campus, a piece of land, and/or so forth. The area can also include several locations and need not be physically proximate to each other. They are related in that they are under the same security operation and/or owned by a single individual and/or entity.

The security management function as described herein may be generally hosted on a security operation center terminal 104 and/or one or more computing nodes at the security operation center 114. The security operation center terminal 104 may be distributed processing nodes that are scalable according to workload demand. In various embodiments, the security operation center terminal 104 may include general purpose computers, such as desktop computers, tablet computers, laptop computers, servers, and so forth. However, in other embodiments, the security operation center terminal 104 may be in the form of virtual machines, such as virtual engines (VE) and virtual private servers (VPS). The security operation center terminal 104 may store data in a distributed storage system, in which data may be stored for long periods of time and replicated to guarantee reliability. Accordingly, the security operation center terminal 104 may provide data and processing redundancy, in which data processing and data storage may be scaled in response to demand. Further, in a networked deployment, new security operation center terminal 104 may be added on the fly without affecting the operational integrity of the security management system.

The security operation center terminal 104 is in communication with a plurality of sensors 102 that is positioned around or on a physical property (i.e., a building, fences, borders, listening post/observation post (LP/OP), natural or man-made structures, etc.) within the defined property perimeter. In various embodiments, the sensors 102 comprise motion sensors, heat sensors, vibration sensors, sound sensors, accelerometers, electronic support measures (ESM), flash LIDAR, GPS, infrared (IR) thermal imaging camera, magnetic sensors, phased array, radar, radio telescope, scanning LIDAR, seismic sensors, sonar and other acoustic sensors, and/or so forth, wherein one or more sensors can be located at one or more ground control points 106 in the area. Additionally, the security operation center terminal 104 is in communication with a plurality of cameras 108 positioned throughout the area, including exterior and interior parts of structures (i.e., buildings) in the area, and a plurality of UGVs/UAVs (i.e., ground rovers 128 and drones 110, respectively), wherein the cameras 108 can be an infrared camera, a video camera, and/or other types of image capturing device that can comprise image processing capabilities, depending upon embodiments. In addition to the security operation center terminal 104, the sensors 102, cameras 108, and UGVs/UAVs 128, 110 can communicate with each other. In this way, these devices can work in concert with each other in a coordinated manner while collecting surveillance data in the area.

In various embodiments, the UGVs/UAVs 128, 110 are configured to analyze motion detection and object recognition/detection. Additionally, the UGVs/UAVs 128, 110 are configured to track or follow moving and/or stationary objects. It is contemplated that UGVs/UAVs 128, 110 can comprise a processor and/or a companion computer that is connected to a controller, a video camera, an IR camera, a network interface controller (NIC), and one or more sensors, wherein the one or more sensors can comprise at least one type of aforementioned sensors. The controller is connected to one or more motors. In various embodiments, the drone 110 comprises a flight controller that is connected one or more motors. Each of the motors is connected to an electronic speed control (ESC). Additionally, the UGVs/UAVs 128, 110 can be summoned to a charging dock 112 for charging, wherein the charging dock 112 can be located in the area within the property perimeter. The UGVs/UAVs 128, 110 are configured to collect surveillance data obtained within the area during deployment. In some embodiments, the UGVs/UAVs 128, 110 can conduct light analysis in that the UGVs/UAVs 128, 110 can detect and recognize objects, and tag the objects as a target to track the objects.

During deployment, the UGVs/UAVs 128, 110 are configured to move along a predetermined patrol route within the property perimeter. In this way, a first ground rover 128 can cover a first area while a second ground rover 128 covers a second area, wherein the first area and the second area can slightly overlap so that all parts of the monitored areas are covered. Additionally, the UGVs/UAVs 128, 110 can be remotely controlled, for example, from the security operation center terminal 104. In this way, patrol routes can be changed on the fly as needed. Alternatively, the UGVs/UAVs 128, 110 can patrol a route based at least partially on a rule-based system. For example, the UGVs/UAVs 128, 110 can be programmed to automatically navigate to a location where motion is detected. In this regard, a drone 110 can receive sensor data indicating that motion has been detected from a standalone motion sensor 102 or a motion sensor 102 that is integral to the drone 110. In another example, the UGVs/UAVs 128, 110 can be programmed to automatically detect and avoid obstacles.

All surveillance data (i.e., sensor data, video, etc.) collected via the sensors 102, cameras 108, and UGVs/UAVs 128, 110 within the property perimeter is transmitted to the security operation center terminal 104 at the security operation center 114. In this regard, the sensors 102 and the cameras 108 also comprise a NIC or similar means for streaming the video and/or sensor data to the security operation center terminal 104.

The video stream and other image data obtained from the camera 108 can be used to generate a property map 118 of the area. In various embodiments, aerial photography can be stitched together to generate the property map 118. Additionally, image data from third party sources (e.g., satellite and/or drones, etc.) and other relevant data (e.g., a 3D point cloud, sensor-generated data such as data generated from LIDAR, thermal imaging, etc.) can be used to enhance, supplement, augment, and/or complete the property map 118. New video stream, image data, and other relevant data are continuously analyzed and compared to the old or existing video stream, image data, and other relevant data in order to update the property map 118 on a scheduled basis. If there are no noticeable differences in the new video stream, image data, and other relevant data compared to the existing data, then the property map 118 does not need to be updated. Preferably, the property map 118 comprises GPS coordinates and includes information or data pertaining to man-made or natural key physical features (e.g., trees, rocks, drops, obstacles, etc.). The key physical features can be used to establish patrol routes and perimeter boundaries.

Various sensor data obtained from the sensors 102 are fused via a sensor fusion module 116 at the security operation center terminal 104. The sensor fusion module 116 processes the sensor data inputs to generate, for example, object-tracking data or other relevant surveillance data. In this regard, the sensor fusion module 116 can sort through sensor data to identify the best and most useful data from each sensor 102 to combine the best and most useful data from each sensor 102. In various embodiments, the sensor fusion module 116 can also combine the best and most useful data from the sensors 102 with the best and most useful data (e.g., video streams) from the cameras 108. Without limitation, the object-tracking data can include a list of information regarding the type of object, distance from key physical features, and/or so forth. For example, if the object is a vehicle, the object-tracking data can include the vehicle type, the make, model, and year of the vehicle, vehicle color, license plate number of the vehicle, direction of travel of the vehicle, and the speed at which the vehicle was traveling. Furthermore, the sensor data inputs can be time tagged (i.e., via timestamping) to provide time-related data, which can increase accuracy and provide a more reliable set of data that can be used, for example, time series analysis.

The security operation center terminal 104 has access to resources in a cloud computing environment having a plurality of computing nodes via a network that can comprise a secured network. The network may be a local area network (LAN), a larger network such as a wide area network (WAN), or a collection of networks, such as the Internet. In one aspect, the sensor fusion module 116 can reside at cloud services 146, wherein the cloud services 146 is in communication with a plurality of SOCs 114, each of the SOCs 114 operatively connected to sensors, cameras, and/or UGVs/UAVs for collecting surveillance data in the areas where the SOCs 114 are located or stationed. It is contemplated that a monitored area or a single security operation can comprise a plurality of SOCs 114 that work together, wherein surveillance data streams (i.e., video streams, sensor data streams, etc.) can be distributed between two or more SOCs 114.

In various embodiments, the cloud services 146 can control hardware resources (i.e., sensors 102, cameras 108, UGVs/UAVs 128, 110, etc.) and manage data processing and storage. For example, the cloud services 146 comprise device data associated with each of the cameras 108, sensors 102, drones 110, ground rovers 128, and/or other devices.

The cloud services 146 can transmit instructions to a specific device using, for example, a device identifier associated with the device. The device can receive the instructions via its network interface controller and process the instructions to operate according to the instructions. In this way, the cloud services 146 can remotely control cameras 108, sensors 102, drones 110, ground rovers 128, and/or other devices operating in the area. In another example, the cloud services 146 can comprise databases 148 that facilitate the acquisition, processing, storage, reporting, and analysis of data from multiple data sources (i.e., sensors 102, cameras 108, UGVs/UAVs 128, 110, etc.).

The cloud services 146 can be operatively connected to one or more monitoring service providers 130, wherein the monitoring service providers 130 can provide security and surveillance services. It is contemplated that the monitoring service providers 130 can comprise entities, individuals, and/or so forth. An end user can select a monitoring service provider 130 to purchase and receive security and surveillance services for a subscription period, wherein the user can specify the subscription period. The selected and credentialed monitoring service provider 130 can subscribe to a sensor and/or video data stream of the area during the subscription period from the cloud services 146. Particularly, the monitoring service provider 130 can view clips or stream video and receive alerts and notifications via a web and/or a mobile application 136, 138 that is configured to provide a front-end UI. Similarly, the end user can also access a web and/or a mobile application 136, 138 to view video clips, stream videos, receive alerts and notifications, search for and purchase security and surveillance services from one or more monitoring service providers 130, conduct onboarding and credentialing for monitoring service providers, manage subscription for monitoring service providers, set user preferences and settings, and customize user-specific security needs. Furthermore, users and/or monitoring service providers 130 can manage, access, and control hardware resources and surveillance data from an end user terminal via the web application 136, the mobile application 138, and/or other software applications. In various embodiments, the end user terminal can comprise general purpose computers such as desktop computers 142 and/or mobile devices 140.

Further, the cloud services 146 can provide software utilities for managing computing and storage resources. For instance, the cloud services 146 may provide a generic user interface for handling multiple underlying storage services that stores the data collected by the cameras 108, sensors 102, drones 128, ground rovers 110, and/or other devices. Additionally, the cloud services 146 may provide monitoring utilities to oversee utilization of resources such as hardware resources (i.e., sensors 102, cameras 108, UGVs/UAVs 128, 110, etc.) and alerts for managing data storage or processing capacity. Accordingly, the cloud services 146 may facilitate the deployment, configuration, and activation of hardware resources and software applications and/or services.

Figure 2:
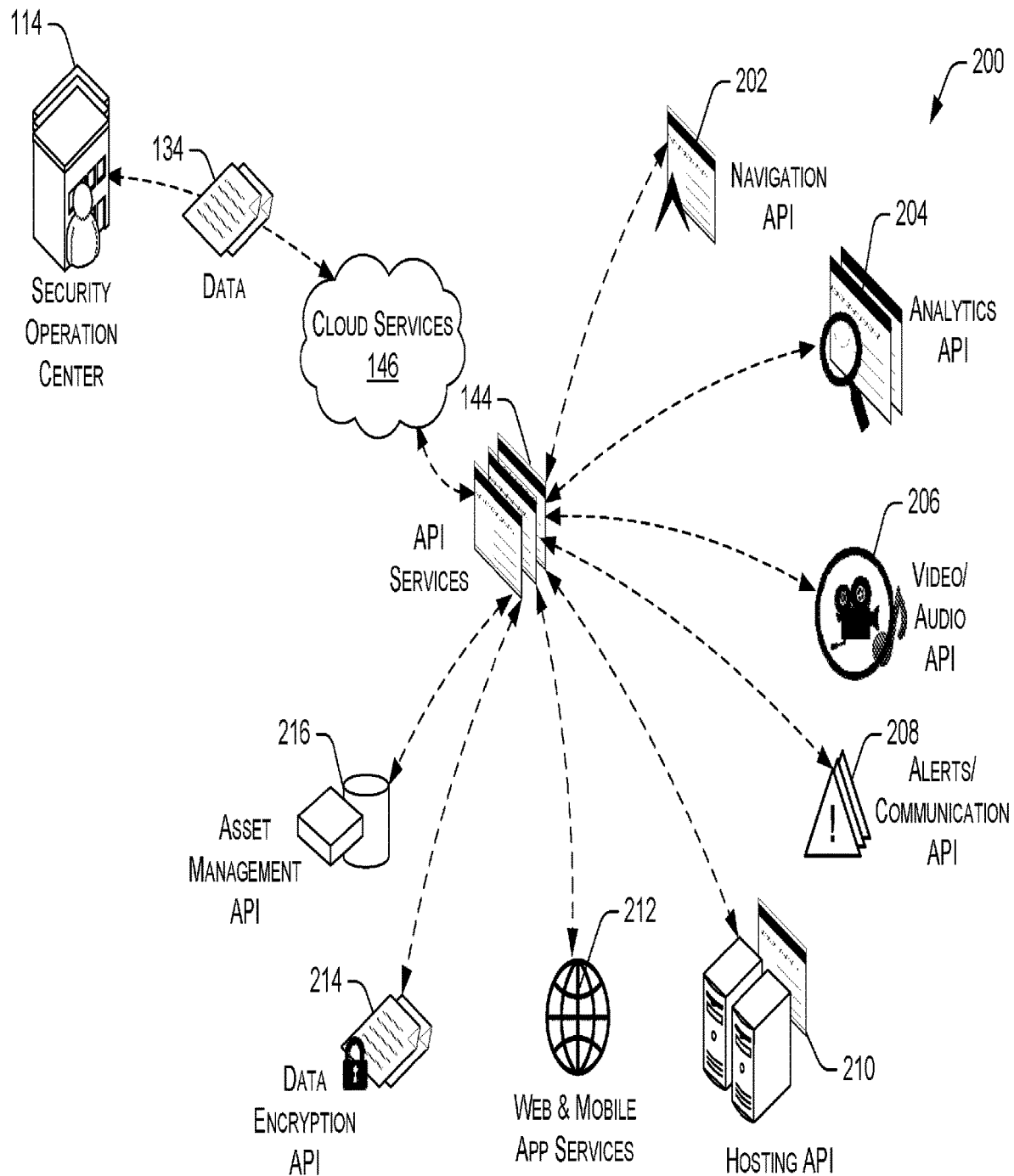
FIG. 2 shows an exemplary embodiment of API services.

In various embodiments, the cloud services 146 can provide one or more API services 144 as depicted in FIG. 2. The cloud services 146 can comprise a TPSS cloud and/or third-party cloud services. Without limitation, API services 144 comprise navigation API 202, analytics API 204, video and audio API 206, alerts and communication API 208, hosting API 210, web and mobile application services 212, data encryption API 214, and asset management API 216, depending upon embodiments. It is noted that other types of API services may be implemented depending on client-specific needs or to provide additional functions. Additionally, functions of two or more API services 144 can overlap in whole or in part to provide redundancy to meet processing demands during peak performance data processing times.

The navigation API 202 is configured to manage property maps with GPS coordinates, annotated man-made or natural key physical features and obstacles (e.g., barriers, a body of water, drawbridges, etc.), wherein data pertaining to one or more key physical features and obstacles can be stored in an obstacle database. In this regard, the navigation API 202 can facilitate in obtaining video streams and image data to update the property map on a scheduled basis. The navigation API 202 can also establish and maintain path or patrol route planning based at least on the data extracted from the property maps and a security and surveillance mission. Without limitation, exemplary security and surveillance missions can include a border protection mission, critical infrastructure and sensitive site defense mission, reconnaissance mission, responding to incidents and calling for aid mission, and/or so forth. In one instance, the navigation API 202 can position UGVs/UAVs near the property perimeter for a border protection mission. In another instance, the navigation API 202 can position UGVs/UAVs near a valuable cache for a critical infrastructure and sensitive site defense mission.

The API services further comprise analytics API 204 that uses machine learning (e.g., rule-based machine learning) and non-machine learning techniques such as decision tree learning, association rule learning, artificial neural networks, inductive logic, Support Vector Machines (SVMs), clustering, Bayesian networks, reinforcement learning, supervised learning, unsupervised learning, representation learning, similarity and metric learning, and sparse dictionary learning. In this regard, the analytics API 204 can utilize user preference settings and/or derive data (e.g., risk levels and courses of actions provided for similar situations, outcomes, etc.) from past or similar missions to conduct analysis. Additionally, the analytics API 204 utilizes pattern detection (e.g., traffic patterns, scheduled deliveries, and visitors, etc.), object recognition (e.g., license plate recognition, facial recognition, etc.) based on images using sensor data and video feeds obtained from the cloud services 146. In this way, the analytics API 204 can identify anomalies, assess risks, and provide recommendations for one or more courses of action to neutralize or reduce the risks.

For example, the analytics API 204 can identify a regular mailman using, for example, facial recognition, and expect the mailman at approximately the same time Monday through Saturday to deliver mail to the monitored property. If the mailman delivers mail at the expected time on a Monday, the analytics API 204 determines that there is no anomaly, risk, or threat to the area and no action is required. If the mailman does not deliver mail at the expected delivery time on a Tuesday, the analytics API 204 identifies the anomaly and can transmit a notification to a user indicating that the mailman did not deliver mail that day. In another example, if a different mailman delivers mail, and the analytics API 204 cannot identify the new mailman, the analytics API 204 can identify the anomaly and transmit a notification to a user indicating that an unknown person has delivered mail. Based on the assessments of the analytics API 204, the cloud services 146 can control hardware resources (i.e., sensors 102, cameras 108, UGVs/UAVs 128, 110, etc.) based at least on machine learning algorithm as implemented by a rules engine. For example, the rules engine can implement if/then statements to, track an object if the object is not recognized or identifiable. In this way, the cloud services 146 can automatically activate one or more UGVs/UAVs 128, 110 to track any unknown person that approaches the area.

The API services further comprise video and audio API 206 for archiving video and audio clips and image data, analyzing videos, audio, and images, detecting objects and/or people from the videos and images, and recognizing voices and/or sounds from audio clips. In this regard, the video and audio API 206 can access various databases where video and audio clips and image data are stored and maintained. The API services further comprise alerts and communication API 208 for providing alerts, notifications, announcements, messages, and/or so forth to users, MSPs, SOCs, and/or third parties via phone, SMS, email, and other communication channels, wherein the users can create and manage alert rules. In one instance, the alerts and communication API 208 can be used to call for aid, such as emergency services, including emergency medical services, law enforcement services, fire department, and/or so forth. In another instance, the alerts and communication API 208 can be used to notify the end user of a security breach. Further, the alerts and communication API 208 can be used to facilitate communication among users, MSPs, SOCs, and/or third parties.

The API services further comprise hosting API 210 for creating and managing application links for all the mobile environments supported, wherein the hosting API 210 includes SOC remote access management. The hosting API 210 can store code, data, or other information used to interface the web application and the mobile application within the end user terminals or other devices. The API services further comprise a web and mobile application services 212. The web and mobile application services 212 is configured to provide a front-end UI.

For example, the web application comprises a front-end UI for managing and accessing a property map with sensor status, receiving and transmitting live videos, providing alerts, notification, and/or messages, keeping a log of sensor data and video feeds, archiving data, and managing configuration and rules. The web application, via the front-end UI, allows for controlling hardware resources such as sensors (e.g., activate alarms, ignore), cameras (e.g., pan-tilt-zoom), and/or UGVs/UAVs. The web application can communicate with cloud services and one or more servers to backup, host, and conduct video analysis.

Similarly, the mobile application comprises a front-end UI that is configured to provide alerts and clips via SMS or call. Additionally, the mobile application front-end UI is configured to provide live feed of videos, receive notifications and alerts, respond to notifications and alerts (e.g., ignore alerts or contact authorities), conduct inspections (e.g., upon detecting motion or other rule-based triggers, send UGVs/UAVs to inspect an area of interest), access sensor data, manage log, and view map, perimeter, and view status of sensors. Further, the front-end UI allows an end user to shop for MPS, conduct MSP onboarding and credentialing, and manage MSP subscriptions.

The API services further comprise data encryption API 214 for managing PKI to ensure that only authorized MSPs have access to video and sensor stream from the cloud services 146 for a specified amount of time or the subscription period. Specifically, the data encryption API 214 can issue and manage digital certificates used for enabling authentication and encryption. In various embodiments, various definable authentications such as a PKI-based authentication protocol, Authentication and Key Agreement (AKA) scheme, and/or other authentication protocol such as multi-factor authentication and SAS certification for securely transmitting surveillance data to authorized MSPs can be used. Disclosed embodiments can use a blockchain as an infrastructure to implement PKI. A block chain provides a trust system between parties (e.g., MSPs and SOCs) through cryptographic smart contract execution, cryptographic credentials and exchange, and network account verification. The API services further comprise asset management API 216 for managing sensors, cameras, UGVs/UAVs, and other devices for conducting security and surveillance operations. In one embodiment, the asset management API 216 comprises a sensor database or a device database that comprises information associated with each of the sensors, drone inventory, ground rover inventory, MSP database that comprises information associated with each MSP, and subscription management that comprises subscription information associated with each MSP. The APIs of the cloud services 146 may be used by custom analytic engines and/or other third party tools to access the data in the different databases, depending upon embodiments.

Figure 3:
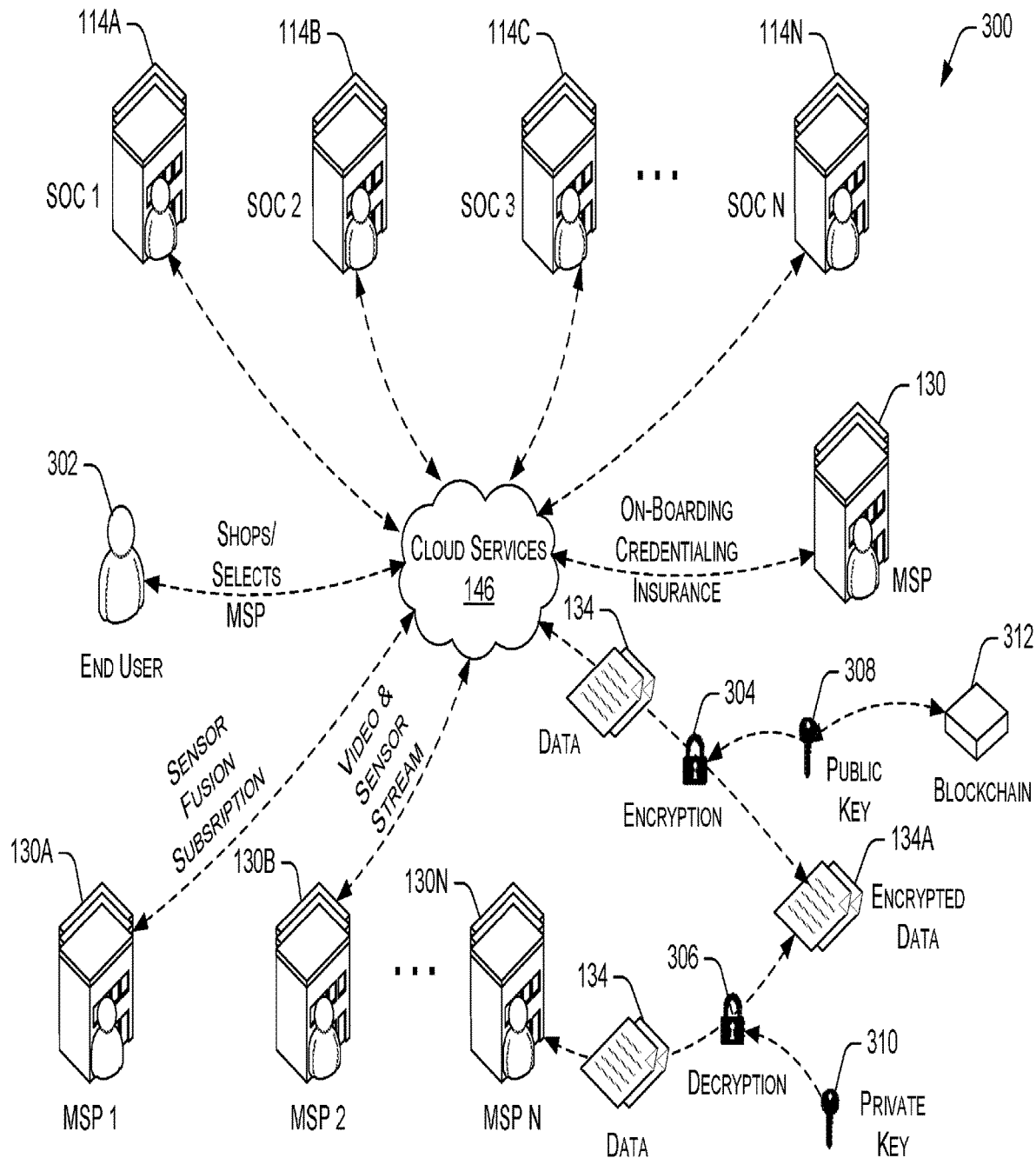
FIG. 3 shows example architecture for managing monitoring service providers.

Referring now to FIG. 3, there is shown example architecture for managing monitoring service providers 130-130N. In one embodiment, an end user 302, via an application hosted on cloud services 146, can search or shop for and select one or more MSPs on the application platform for hire (i.e., on a subscription basis, ongoing basis, on-demand basis, etc.). The user can input the user's search query via the application, wherein the search query can comprise the user's preferences and criteria which monitoring service providers must meet. For example, the user can specify the location of the property for surveillance, desired community, customer, and/or industry ratings and reviews, credentials, and/or so forth. The user can also provide additional information about the area to be monitored and the type or the level of security needed. Preferably, each of the end user and the MSPs can comprise a profile that is associated with an account that is managed via the application. Account and profile information can be stored in a database. Information from MSPs' profiles can be used to find MSPs that matches the user's search query.

Based on the user's search query, the application is configured to retrieve and display a list of MSPs 130-130N that meet the user's preferences and criteria, for example, via a front-end UI of an application. Upon receiving a selection for one or more MSPs 130-130N on the application platform, the selected MSPs 130-130N are required to go through an onboarding and credentialing process. During the onboarding and credentialing process, the MSPs 130-130N may provide insurance information, verification requirements (e.g., licenses, certifications, compliance documentation, etc.), list of security and surveillance services offered, fee schedule, and other relevant information for providing security and surveillance and related services. In various embodiments, the application can provide a wizard or guided assistance for streamlining the onboarding process. Alternatively, the MSPs can upload relevant information and documentations to their profile to automate the onboarding and credentialing process. It is contemplated that the onboarding process is overseen by a credentialing entity that can be a third party, the SOC, and/or the user. Upon completing the onboarding and credentialing process, the user 302 can purchase or subscribe to security and monitoring services from the selected MSP 130 for a desired length of time. For example, the user can define a subscription period to obtain security and monitoring services from the selected MSP on annually, monthly, weekly, daily, and/or hourly basis. The subscription period can be automatically renewed depending on the user's preferences. In this regard, it is contemplated that the application comprises a payment-processing module for facilitating payment from the user 302 to the selected MSP, wherein the user's payment information can be associated with the user's account.

During the subscription period, the selected MSP is granted access to surveillance data 134, which comprises sensor fusion and video and sensor stream. The selected MSP can receive live video and sensor stream, and/or sensor fusion subscription corresponding to the property that it is monitoring from the cloud services 146, wherein the cloud services 146 can sort and consolidate sensor data and video feed received from respective SOCs 114A-114N. Each stream is available to the selected MSP for a set time limit or for the duration of a subscription period via a PKI-based authentication protocol. Thus, the selected MSP cannot receive video and sensor stream and/or sensor fusion subscription if the subscription period is over. The data 134 that is transmitted from the cloud services 146 is encrypted 304 with a public key 308 that can be stored in a blockchain 312. Additionally, the blockchain 312 can be a repository for PKI certificates. The encrypted data 134A can be decrypted 306 with a private key 310 available to the MSP. Introduction of the selected MSP to the blockchain 312 can validity information such as an expiration date or the date that the subscription ends such that transactions involving a private key that is accessible to the MSP after the subscription period may indicate improper or unauthorized use. Subsequently, the MSP is unable to receive live video and sensor stream, and/or sensor fusion subscription.

In various embodiments, the user can select a plurality of MSPs 130A-130N, wherein each MSP can receive different surveillance data to provide different security and surveillance services. Said another way, the user can receive different security and surveillance services from each MSP. For instance, a first MSP 130A can receive sensor fusion subscription and a second MSP 103B can receive video and sensor stream. Alternatively, all of the MSPs 130A-130N can receive the same surveillance data from the cloud services 146 and provide the same security and surveillance services for redundancy and/or backup. Additionally, subscription period can be different for each MSP 130-130N. For instance, the subscription period can be six months for the first MSP 130A and ten months for the second MSP 103B. In various embodiments, the cloud services 146 can be configured to interconnect with the SOCs and MSPs in order to map different SOCs to one or more specific MSPs and transmit surveillance data from the SOCs to respective MSPs. In this way, the cloud services 146 can facilitate a fully meshed connectivity and manage multiple SOCs and MSPs without affecting the operational integrity even in scenarios where one or more SOCs and/or MSPs are added, replaced, removed, and/or so forth.

Exemplary Computing Device Components

Figure 4:
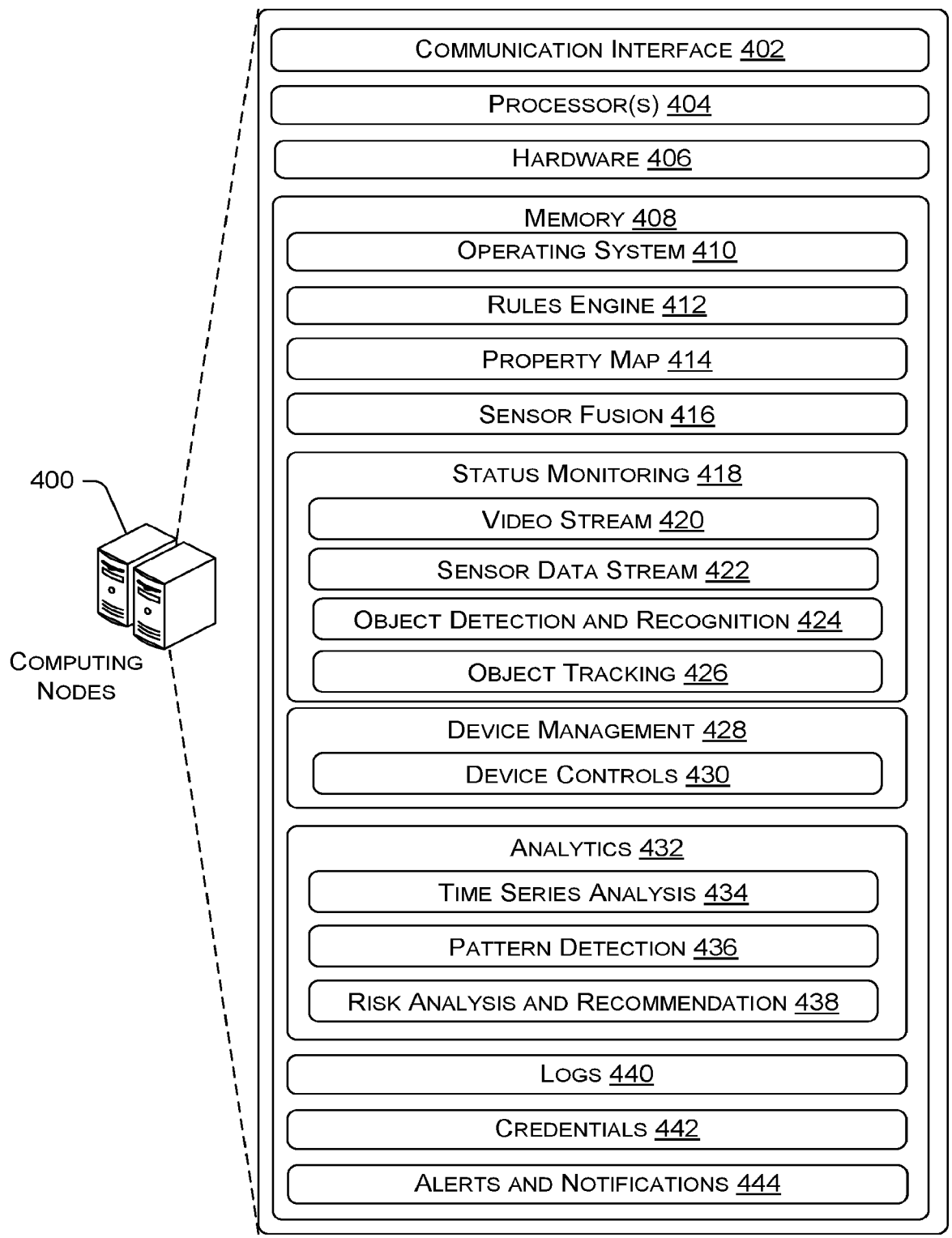
FIG. 4 shows a block diagram showing various components of an illustrative computing device that implements the security system of the present invention.

Referring now to FIG. 4, there is shown a block diagram showing various components of an illustrative computing device that implements the security and surveillance system of the present invention. The security system may be implemented by one or more computing nodes 400 of a distributed processing computing infrastructure. The number of computing nodes 400 may be scaled up and down by a distributed processing control algorithm based on data processing demands. For example, during peak performance data processing times, the number of computing nodes 400 that are executing data processing functionalities of the present security system may be scaled up on the fly based on processing demand. However, once the processing demand drops, the number of computing nodes 400 that are executing the data processing functionalities may be reduced on the fly. Such scaling up and scaling down of the number of computing nodes 400 may be repeated over and over again based on processing demand.

The computing nodes 400 may include a communication interface 402, one or more processors 404, and memory 408. The communication interface 402 may include wireless and/or wired communication components that enable the one or more computing nodes 400 to transmit data to and receive data from other networked devices. Specifically, the computing nodes 400 can communicate with cloud services to transmit data thereto and therefrom, wherein the cloud services can be connected to third-party servers (e.g., authorities), depending upon embodiments. The computing nodes 400 may be accessed via hardware 406.

The hardware 406 may include additional user interface, data communication, data storage hardware, input/output (I/O) interface, a network interface, and/or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices. The I/O interface may be any controller card, such as a universal asynchronous receiver/transmitter (UART) used in conjunction with a standard I/O interface protocol such as RS-232 and/or Universal Serial Bus (USB). The network interface may potentially work in concert with the I/O interface and may be a network interface card supporting Ethernet and/or Wi-Fi and/or any number of other physical and/or data link protocols. Accordingly, sensors may interface with the telemetry capture function via a connected port, serial or parallel, and/or via networking.

Memory 208 is any computer-readable media, which may store several software components including an operating system 210 and/or other applications. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The memory 408 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism. The memory 408 may also include a firewall. In some embodiments, the firewall may be implemented as hardware 406 in the computing device 400.

The processor 404 may be a central processing unit, a repurposed graphical processing unit, and/or a dedicated controller such as a microcontroller. The processors 404 and the memory 408 of the computing device 400 may implement an operating system 410 and the security and surveillance system. The operating system 410 may include components that enable the computing device 400 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The memory unit 408 can comprise property maps 414 locally residing thereon, wherein the property maps 414 are acquired by video streams 420 provided by the cameras and other image data sources, further wherein the video streams 420 can be stored in the memory unit 408. The memory unit 408 can store property maps 414 for multiple locations associated with multiple security and surveillance operations, wherein the locations need not be physically proximate to each other. The maps 414 comprise various location data, including GPS coordinates of the perimeter and data on key physical features (e.g., trees, rocks, drops, obstacles, buildings, structures, etc.) of the property for establishing patrol routes and perimeter boundaries.

The memory unit 408 further comprises a status monitoring module 418 that is configured to provide security status reporting of a monitored property. The status monitoring module 418 comprises video streams 420, sensor data streams 422, object detection and recognition module 424, and object tracking module 430. The video streams 420 and the sensor data streams 422 provide real-time information that can be used to determine the security status of a property. The object detection and recognition module 424 is configured to perform image analysis in order to detect and objects and recognize or identify the detected objects. For example, the object detection and recognition module 424 is configured to detect the presence of a person on a monitored property and identify the person using facial recognition techniques. In another example, the object detection and recognition module 424 is configured to detect the presence of a vehicle on a monitored property and identify the vehicle make and model. Additionally, the object detection and recognition module 424 can identify the vehicle by its license plate number. The object tracking module 430 is configured to keep track of the status and/or location of the detected object on the monitored property. For instance, the object tracking module 430 can track the location of a vehicle on a monitored property. In various embodiments, the object tracking module 430 can keep track of the detected object using image data such as video streams 420, wherein the image data can be tagged with time data. Additionally, the object tracking module 430 can keep track of the detected object using sensor data streams 422 such as data from thermal imaging. Further, the object tracking module 430 can keep track of the detected object using data from both the video streams 420 and the sensor data streams 422.

Any change in security status can be logged, recorded, and/or reported via an alerts and notifications module 444, wherein the alerts and notifications module 444 is configured to provide alerts, notifications, announcements, messages, and/or so forth to users, MSPs, SOCs, and/or third parties via phone, SMS, email, and other communication channels. The status monitoring module 418 can be operatively connected to a sensor fusion module 416, wherein the sensor fusion module 416 can receive inputs from the video streams 420 and sensor data streams 422 to output sensor fusion data. For example, the sensor fusion module 416 can output object-tracking data that can be utilized via the object tracking module 426. In another example, the sensor fusion module 416 can output image data that can be utilized via the object detection and recognition module 424.

The memory unit 408 further includes a rules engine 412, wherein the rules engine 412 can be configured to client-specific needs, mission-specific needs, and/or location-specific needs, wherein the needs can be input by an end user and/or an MSP. In one instance, the rules engine 412 comprises if/then statements, preconditions, and/or other functions to, for example, transmit notifications or activate alarms via an alerts and notifications module 444 upon detecting the presence of an unauthorized personnel or upon a change in a status as determined by the status monitoring module 418. Similarly, the rules engine 412 can comprise instructions and/or code segments to automatically track unauthorized personnel or other targeted objects.

The rules engine 412 can act in concert with the analytics module 432 that is configured to conduct time series analysis 434, pattern detection 436, and risk analysis and recommendation 438. The time series analysis module 434 can utilize video stream 420 and sensor data stream 422, and/or sensor fusion data to conduct analyses of events that occur within the monitored property over a given period of time. In this regard, the video stream 420 and sensor data stream 422 can include time-related data for enabling the time series analysis module 434 to identify sequence of events. Similarly, the pattern detection module 436 is configured to utilize video stream 420 and sensor data stream 422, as well as sensor fusion data in order to recognize patterns of events based on previous events that occurred over a given period of time. For example, the pattern detection module 436 can recognize traffic patterns and scheduled visitors, deliveries, and/or so forth. Additionally, the pattern detection module 436 can recognize an end user's or a business' day-to-day routines. The risk analysis and recommendations module 438 can be configured to provide one or more recommendation on courses of actions based at least on time series analysis and pattern detection, wherein each of the courses of actions can be generated to reduce or neutralize any existing risks. For example, the risk analysis and recommendations module 438 can recommend increasing physical security within the monitored property based on an anomaly in a pattern, such as presence of unscheduled visitors.

In various embodiments, the analytics module 432 can leverage a trained machine learning model to analyze the surveillance data and output of risks to recommend courses of action and make decisions. A trained machine learning model can be generated by using a training data input, wherein the training data emulates data collected from multiple data sources (i.e., hardware components such as sensors, cameras, drones, ground rovers) and optionally a set of desired outputs for the training data (e.g., desired courses of actions or decisions). Following the application of a selected machine learning algorithm to the training corpus, a model training module may determine a training error measurement of the machine learning model. The training error measurement may indicate the accuracy of the machine learning model in generating a solution. If the training error measurement exceeds a training error threshold, the model training module may use the rules engine 412 to select an additional type of machine learning algorithm based on a magnitude of the training error measurement. In operation, the machine learning model may incorporate a combination of multiple machine learning algorithms, such as a Bayesian algorithm, a decision tree algorithm, a (SVM) algorithm, to improve the recommended courses of actions generated by the model. Following the selection of the additional type of machine learning algorithm, the model training module repeat the determination of the training error measurement for the machine learning model, and the selection of one or more types of additional machine learning algorithms to augment the machine learning model with additional training results until the training error measurement is at or below the training error threshold. The analytics module 432 may generate courses of action to resolve security issues using one or more of the trained machine learning models, thereby enabling the automatic resolution of increase security risks.

The sensors, cameras, UGVs/UAVs, and other devices that are deployed for conducting security and surveillance operations are managed via a device management module 428. The device management module 428 inventories the devices that are registered to operate and that are in need of repair or maintenance. In this regard, a device's make, model, and/or serial number can be input and stored, for example, in a device database. The device management module 428 is further configured to request for additional or replacement hardware resources based on client-specific needs, mission-specific needs, inventory needs, and/or so forth. For example, the device management module 428 can request for repairing cameras and/or receiving a new camera. Device data pertaining to new or replaced hardware are automatically uploaded to the device database. Additionally, device data pertaining to removed hardware resources can be labeled inactive, archived, or deleted from the device database. All of the devices that are registered with the device management module 428 can be controlled remotely via the device controls module 430. In various embodiments, the device controls module 430 can access video streams 420, sensor data streams 422, and/or sensor fusion data to process, integrate, store, and/or analyze to, for example, route UGVs/UAVs and/or to activate and control certain sensors and/or cameras. All surveillance activities and collected surveillance data are recorded in logs 440. Additionally, the computing nodes 400 is configured manage logs 440 of UGV/UAV controls, including multi-vehicle coordination.

The memory 408 further comprises authentication credential module 442 for encrypting and decrypting data and manage PKI. The authentication credential module 442 can include key information for performing an authentication. In some embodiments, the authentication credential module 442 comprises an Authentication and Key Agreement (AKA) scheme, public key infrastructure, and/or other authentication protocol such as multi-factor authentication and SAS certification. In some embodiments, the authentication credential module 442 is configured to perform key exchanges and/or generate a secure digital identifier based on the security credentials in accordance with the PKI-based authentication protocol, other multi-factor authentication, and/or one or more SAS certificates.

Example Processes

Figure 5:
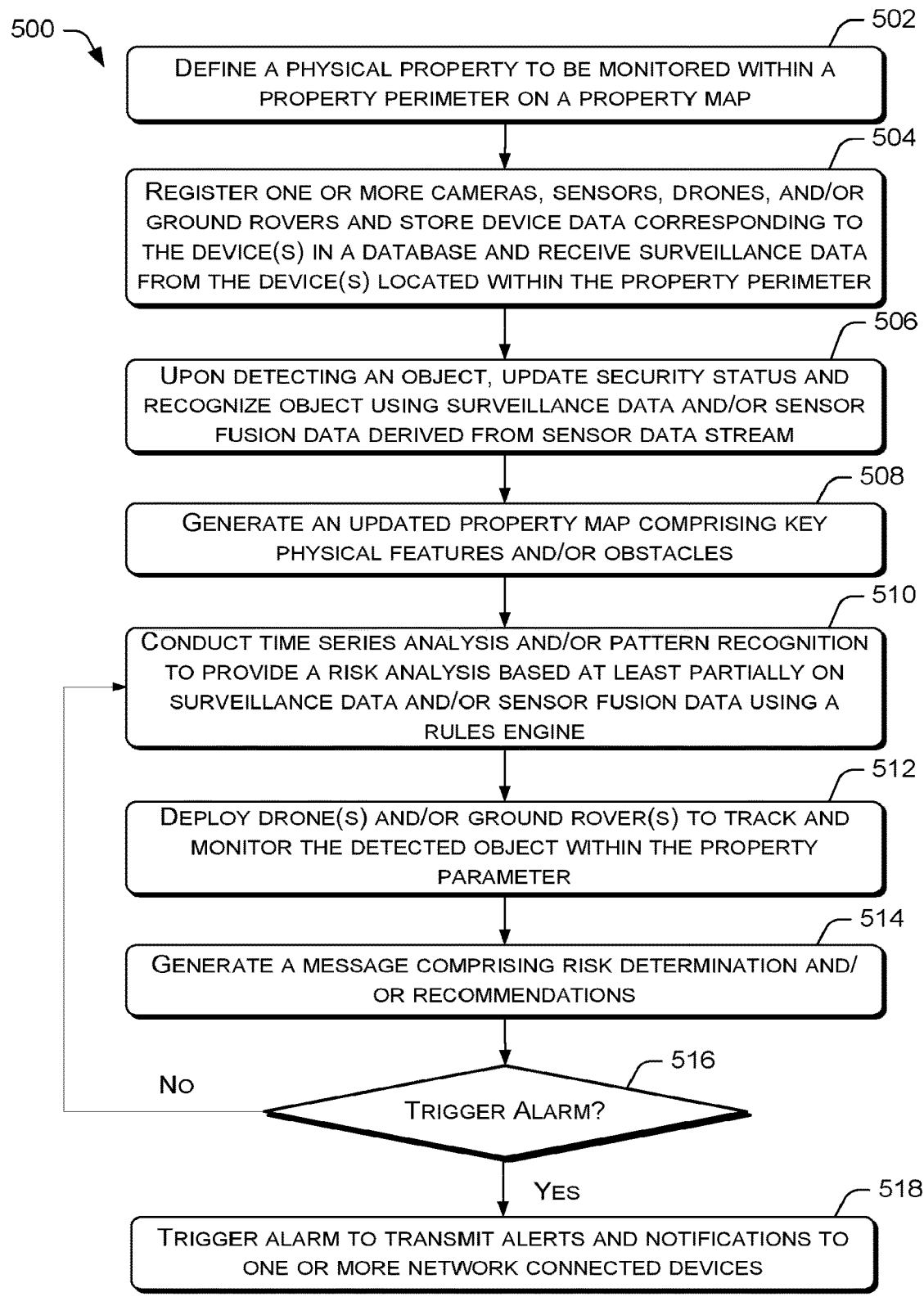
FIG. 5 shows a flow diagram showing an exemplary workflow of implementing the security system of the present invention.
Figure 6:
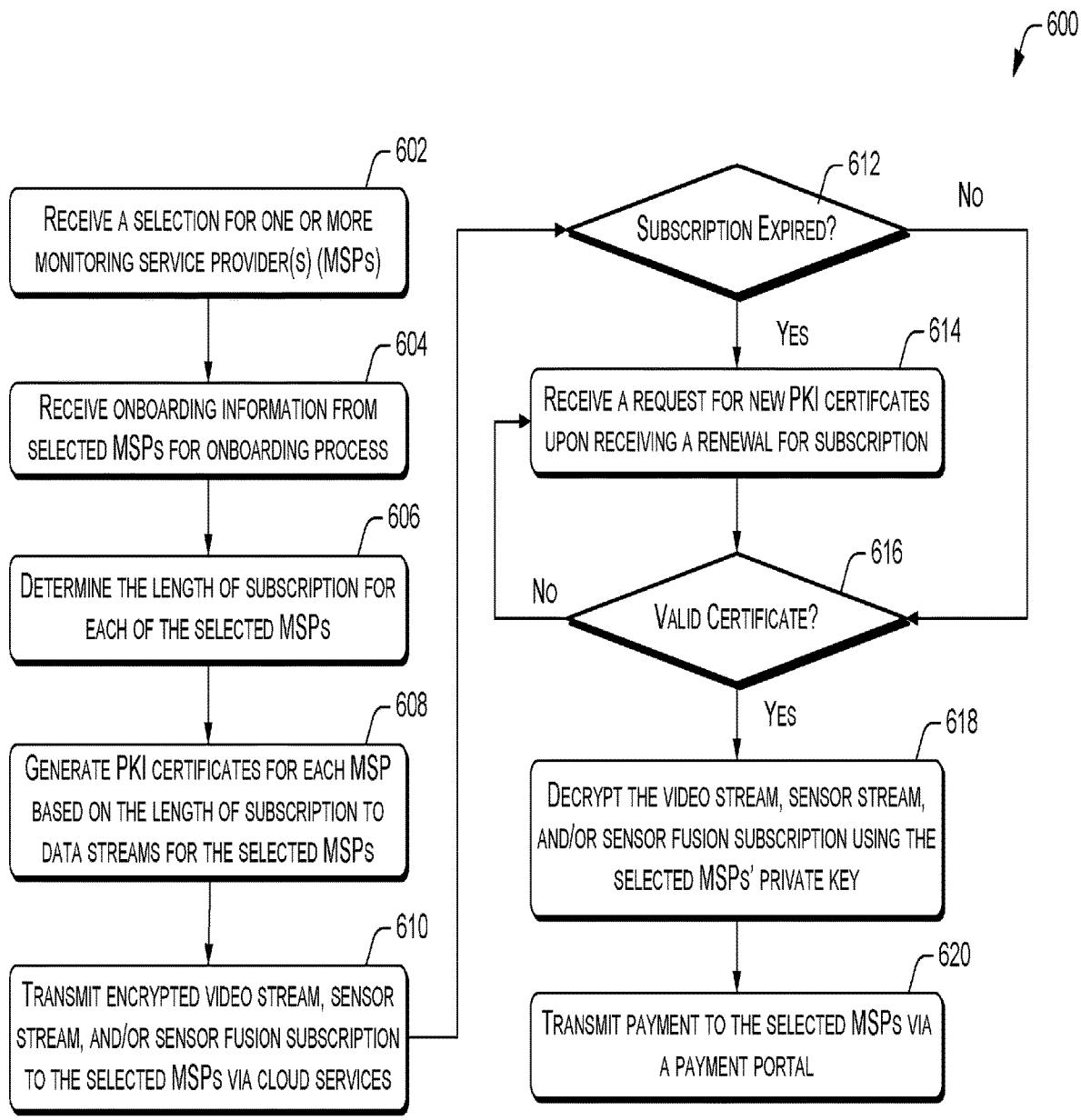
FIG. 6 shows a flow diagram showing an exemplary workflow of managing monitoring service providers.

FIGS. 5 and 6 present illustrative processes 500-600 for conducting security and surveillance operations. Each of the processes 500-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-600 are described with reference to the architecture 100, 200, 300, and 400 of FIGS. 1 through 4, respectively.

FIG. 5 shows a flow diagram showing an exemplary workflow 500 of implementing the security system of the present invention. At block 502, the security operation center terminal defines property perimeter of an area to be monitored on a property map. At block 504, the security operation center terminal, via device management, registers one or more cameras, sensors, drones, and/or ground rover and store associated device data in a database (e.g., a device database) hosted in cloud services and receives video stream and/or sensor data stream from the cameras and sensors, respectively, wherein the cameras and the sensors are located within the property perimeter. In some embodiments, the cameras and/or the sensors are mounted on UGVs/UAVs. Multiple UGVs/UAVs can be coordinated via navigation control through the use of cameras and sensors disposed on the ground (i.e., standalone cameras and sensors) and on UGVs/UAVs. In some embodiments, the drone coordination is in accordance with a rules engine. In this way, UGVs/UAVs can maximize the coverage of monitored property and minimize overlapping.

At block 506, the object detection and recognition module at the security operation center terminal detect object and recognize the object. If the recognized object is a vehicle, the object detection and recognition module is further configured to conduct license plate recognition to identify authorized and unauthorized vehicles. Upon detection, the security status can be updated via the status monitoring module. At block 508, the status monitoring module can update the property map comprising GPS coordinates, key physical features, and/or navigation data. At block 510, the risk analysis and recommendation module conduct risk analysis using a rules engine. In various embodiments, time series analysis and pattern detection of normal versus abnormal conditions can be used to make risk assessments and recommend courses of actions (e.g., contact authorities, activate alarm).

At block 512, the device control module at the security operation center terminal can deploy one or more drones and/or ground rovers to track and monitor the detected object, wherein the objects are tracked via an object tracking module. At block 514, the alerts and notifications module at the security operation center terminal generates a message comprising risk determination and/or recommendations for transmittal to an end user. At decision block 516, the alerts and notifications module at the security operation center terminal determines whether to trigger an alarm (i.e., audible, tactile, and/or visual, etc.), emit alerts, and provide notifications. If the risk is above a predetermined threshold, at block 518, the alarm is triggered. For example, the alerts and notifications module is configured to trigger an alarm if an intruder is detected.

FIG. 6 shows a flow diagram showing an exemplary workflow of managing monitoring service providers. At block 602, the cloud services can receive a selection for one or more monitoring service providers. At block 604, the cloud services can receive onboarding information such as the monitoring service provider's insurance information, certificates, credentialing information, and/or so forth from selected MSPs. At block 606, the cloud services can determine the length of subscription to data streams for the selected MSPs. At block 608, the cloud services can generate PKI certificates with a blockchain transaction, via the authentication credential module, based on the length of subscription to data streams for the selected MSPs.

At block 610, the cloud services can transmit encrypted video stream, sensor stream, and/or sensor fusion subscription to the credentialed MSPs. At decision block 612, the cloud services can determine whether subscription period is expired. At block 614 (yes response from decision block 612), the cloud services can receive a request for new PKI certificates or other credentials. At decision block 616, the cloud services can determine if the certificate is valid. At block 618 (yes response from decision block 616), the cloud services can decrypt the video stream, sensor stream, and/or sensor fusion subscription using the credentialed MSP's private key. At block 620, payment can be transmitted to the selected monitoring service providers via a payment portal, wherein the payment portal can be accessed via a web or mobile application.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A system, comprising:
one or more non-transitory storage mediums configured to provide stored code segments, the one or more non-transitory storage mediums coupled to one or more processors, each configured to execute the code segments and causing the one or more processors to:
receive onboarding information from a plurality of monitoring service providers, the onboarding information comprising credentialing information demonstrating qualifications of each monitoring service provider to provide a surveillance monitoring service;
credential the plurality of monitoring service providers based on the credentialing information;
receive a selection from a user for one or more selected monitoring service providers from the plurality of monitoring service providers to provide the surveillance monitoring service;
define a subscription period for each of the selected monitoring service providers;
generate a public key infrastructure (PKI) certificate for each of the selected monitoring service providers based on the length of the subscription period for the selected monitoring service providers, wherein the PKI certificate is valid for the duration of the subscription period;
transmit encrypted surveillance data to the selected monitoring service providers the surveillance data comprising security camera streams and sensor data associated with mapped physical locations, wherein the PKI certificate allows each selected monitoring service provider to decrypt the surveillance data using the PKI-certificate to provide the surveillance monitoring service.

2. The system of claim 1, wherein the one or more processor is further configured to:
renew the subscription period for one or more of the selected monitoring service providers;
receive a request for a new PKI certificate for the selected monitoring service providers; and
generate the new PKI certificate for the selected monitoring service providers based on the length of the renewed subscription period.

3. The system of claim 1, wherein the one or more processor is further configured to transmit payment to the selected monitoring service providers via a payment portal.

4. The system of claim 1, wherein the onboarding information comprises insurance information.

5. The system of claim 1, wherein the one or more processor is further configured to receive instructions to control for a plurality of devices and a plurality of unmanned vehicles from the selected monitoring service providers, wherein each of the plurality of devices is configured to capture the surveillance data.

* * * * *